(12) United States Patent
Fletcher

(10) Patent No.: US 10,847,106 B2
(45) Date of Patent: Nov. 24, 2020

(54) FAULT-TOLERANT LIQUID CRYSTAL DISPLAYS FOR AVIONICS SYSTEMS

(71) Applicant: L3 Technologies, Inc., New York, NY (US)

(72) Inventor: Mark W. Fletcher, Cumming, GA (US)

(73) Assignee: L3 TECHNOLOGIES, INC., New York, NY (US)

( * ) Notice: Subject to any disclaimer, the term of this patent is extended or adjusted under 35 U.S.C. 154(b) by 36 days.

(21) Appl. No.: 15/893,197

(22) Filed: Feb. 9, 2018

(65) Prior Publication Data

US 2018/0226042 A1    Aug. 9, 2018

Related U.S. Application Data

(60) Provisional application No. 62/456,974, filed on Feb. 9, 2017.

(51) Int. Cl.
G09G 3/20 (2006.01)
G09G 3/36 (2006.01)
B64D 43/00 (2006.01)

(52) U.S. Cl.
CPC ........... *G09G 3/3677* (2013.01); *B64D 43/00* (2013.01); *G09G 3/20* (2013.01); *G09G 3/3688* (2013.01); *G09G 2300/0426* (2013.01); *G09G 2310/0281* (2013.01); *G09G 2330/08* (2013.01); *G09G 2330/12* (2013.01); *G09G 2380/12* (2013.01)

(58) Field of Classification Search
CPC ............. G09G 2310/08; G09G 3/3688; G09G 2310/0286; G09G 2300/0426; G09G 3/3266; G09G 2310/06; G09G 3/20
See application file for complete search history.

(56) References Cited

U.S. PATENT DOCUMENTS 6,057,786 A * 5/2000 Briffe .................. G01C 23/00 340/974
7,295,179 B2   11/2007 Dunn
(Continued)

FOREIGN PATENT DOCUMENTS

JP           3210432       9/2001
KR   10-1999-0052420       6/2005

OTHER PUBLICATIONS

International Search Report and Written Opinion dated Apr. 24, 2018 issued by The International Searching Authority/European Patent Office for related international patent application PCT/US2018/017640 filed Feb. 9, 2018.

*Primary Examiner* — Olga V Merkoulova
(74) *Attorney, Agent, or Firm* — Dickinson Wright PLLC

(57) ABSTRACT

Fault-tolerant liquid crystal displays are delineated for avionics systems. At least some example embodiments are methods including providing an avionics display full screen on the LCD, the providing being implemented by driving source signal lines of the LCD by way of a first source driver circuit through a first set of FETs; driving gate signal lines of the LCD by way of a first gate driver circuit through a second set of FETs; preventing back biasing of a second source driver circuit by electrically isolating the source signal lines from the second source driver circuit; and preventing back biasing of a second gate driver circuit by electrically isolating the gate signal lines from the second gate driver circuit.

19 Claims, 5 Drawing Sheets

(56) References Cited

U.S. PATENT DOCUMENTS

| | | | | |
|---|---|---|---|---|
| 7,724,259 B2* | 5/2010 | Hedrick | ............... | G01C 23/00 |
| | | | | 345/501 |
| 7,728,788 B1* | 6/2010 | Echols | ............... | G09G 3/2092 |
| | | | | 345/1.3 |
| 8,745,366 B2 | 6/2014 | Wyatt et al. | | |
| 9,035,923 B2* | 5/2015 | Kimura | ............... | G09G 3/2096 |
| | | | | 345/204 |
| 9,418,603 B2 | 8/2016 | Dunn et al. | | |
| 2002/0075248 A1* | 6/2002 | Morita | ............... | G09G 3/3648 |
| | | | | 345/204 |
| 2003/0038880 A1* | 2/2003 | No | ............... | H04N 1/00519 |
| | | | | 348/207.1 |
| 2005/0024971 A1 | 2/2005 | Lambert | | |
| 2005/0205880 A1* | 9/2005 | Anzai | ............... | G09G 3/3258 |
| | | | | 257/83 |
| 2006/0007218 A1* | 1/2006 | Miyake | ............... | G09G 3/3258 |
| | | | | 345/204 |
| 2008/0170064 A1* | 7/2008 | Lee | ............... | G09G 3/3677 |
| | | | | 345/214 |
| 2009/0101915 A1* | 4/2009 | Weng | ............... | H01L 31/153 |
| | | | | 257/72 |
| 2011/0018910 A1 | 1/2011 | Chai et al. | | |
| 2011/0148825 A1* | 6/2011 | Ueno | ............... | G09G 3/006 |
| | | | | 345/204 |
| 2011/0254822 A1 | 10/2011 | Anzai et al. | | |
| 2013/0176318 A1 | 7/2013 | Dunn et al. | | |

* cited by examiner

FAULT-TOLERANT LIQUID CRYSTAL DISPLAYS FOR AVIONICS SYSTEMS

CROSS-REFERENCE TO RELATED APPLICATIONS

This application claims the benefit of U.S. Provisional Application Ser. No. 62/456,974, filed Feb. 9, 2017, titled "Fault-Tolerant LCD Display With Chip-On-Glass Isolation." This provisional application is also incorporated by reference herein as if reproduced in full below.

STATEMENT REGARDING FEDERALLY SPONSORED RESEARCH OR DEVELOPMENT

Not Applicable.

BACKGROUND

Fault-tolerant Active Matrix Liquid Crystal Displays (AMLCDs) are useful for flight-critical, primary aircraft cockpit displays (e.g., head-down avionics display) where safety and high reliability are important. Fault tolerance in the context of avionics systems refers to the ability of the system to function such that a single point of failure does not render the entire system inoperative. As the lives of flight crews may depend on the avionics displays, it is important that the avionics systems and avionics displays be reliable.

SUMMARY

At least some example embodiments are methods of operating an avionics system with a fault-tolerant liquid crystal display (LCD) including providing an avionics display full screen on the LCD. The providing the avionics display full screen may comprise: driving source signal lines of the LCD by way of a first source driver circuit through a first set of (field effect transistors) FETs, the first set of FETs disposed directly on a panel glass of the LCD; driving gate signal lines of the LCD by way of a first gate driver circuit through a second set of FETs, the second set of FETs disposed directly on the panel glass of the LCD; preventing back biasing of a second source driver circuit by electrically isolating the source signal lines from the second source driver circuit, the electrically isolating of the source signal lines from the second source driver circuit provided by way of a third set of FETs, the third set of FETs disposed directly on the panel glass; and preventing back biasing of a second gate driver circuit by electrically isolating the gate signal lines from the second gate driver circuit, the electrically isolating the gate signal lines from the second gate driver circuit provided by way of a fourth set of FETs, the fourth set of FETs disposed directly on the panel glass.

Other example embodiments are fault-tolerant LCDs for avionics systems comprising: an LCD comprising a panel glass, source signal lines, and gate signal lines; a first driver circuit comprising a first source driver circuit coupled to the source signal lines, and a first gate driver circuit coupled to the gate signal lines; a first plurality of FETs disposed directly on the panel glass, the first plurality of FETs electrically coupled between the first source driver circuit and the source signal lines; a second plurality of FETs disposed directly on the panel glass, the second plurality of FETs electrically coupled between the first gate driver circuit and the gate signal lines; a second driver circuit distinct from the first driver circuit, the second driver circuit comprising a second source driver circuit coupled to the source signal lines, and a second gate driver circuit coupled to the gate signal lines; a third plurality of FETs disposed directly on the panel glass, the third plurality of FETs electrically coupled between the second source driver circuit and the source signal lines; a fourth plurality of FETs disposed directly on the panel glass, the fourth plurality of FETs electrically coupled between the second gate driver circuit and the gate signal lines; and a control circuit electrically coupled to the first, second, third, and fourth plurality of FETs. The control circuit may be configured to implement a first mode in which the first driver circuit is electrically coupled to the source signal lines and the gate signal lines by way of the first and second plurality of FETs, and the second driver circuit is electrically isolated from the source signal lines and the gate signal lines by way of the third and fourth plurality of FETs. The control circuit may also be configured to implement a second mode in which the first driver circuit is electrically isolated from the source signal lines and the gate signal lines by way of the first and second plurality of FETs, and the second driver circuit is electrically coupled to the source signal lines and the gate signal lines by way of the third and fourth plurality of FETs.

Additional embodiments may comprise: driving source signal lines of the LCD by way of a first source driver circuit through a first set of FETs, the first set of FETs disposed directly on a panel glass of the LCD; driving gate signal lines of the LCD by way of a first gate driver circuit through a second set of FETs, the second set of FETs disposed directly on the panel glass of the LCD; electrically isolating the source signal lines from a second source driver circuit by way of a third set of FETs, the third set of FETs disposed directly on the panel glass; and electrically isolating the gate signal lines from a second gate driver circuit by way of a fourth set of FETs, the fourth set of FETs disposed directly on the panel glass.

BRIEF DESCRIPTION OF THE DRAWINGS

For a detailed description of example embodiments, reference will now be made to the accompanying drawings in which.

DETAILED DESCRIPTION

The following discussion is directed to various embodiments of the invention. None of the disclosed embodiments should be interpreted, or otherwise used, to limit the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to fault-tolerant liquid crystal displays (LCDs) for avionics systems. More particularly, various embodiments are directed to avionics systems that may include an avionics display (e.g., heading indicator, attitude indicator, altitude indicator, air speed indicator or any other desired display), where the avionics system has full-screen LCD redundancy such that even in the presence of a failure of one portion of the system, the avionics system can still drive a full screen avionics display. Additionally, various embodiments are directed to avionics systems with full-screen redundancy that addresses issues of back biasing of driver circuits when the driver circuits are either inactive or inoperable.

Figure 1:
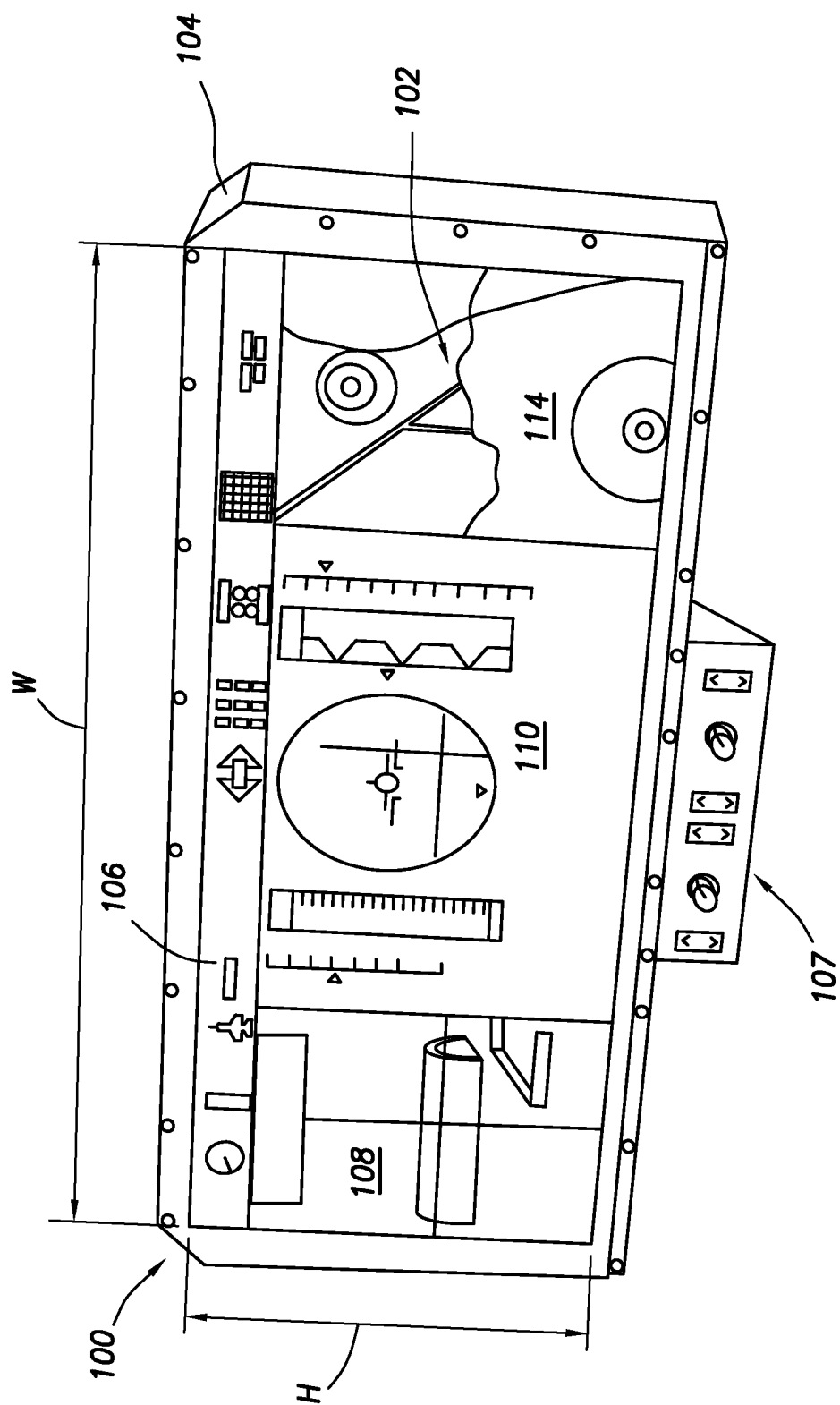
FIG. 1 shows an avionics system in accordance with at least some embodiments.

FIG. 1 shows an avionics system in accordance with at least some embodiments. In particular, avionics system 100 comprises an LCD 102 disposed within a housing or frame 104. The frame 104 may be mounted in the instrument display panel of an airplane cockpit (not specifically shown). The avionics system 100 may incorporate touch screen functionality and may also have various physical buttons, switches and knobs, collectively referred to as controls 107. In example systems, the LCD 102 may have a height H of about 8 inches, and a width W of about 20 inches, but different sizes are also contemplated. The LCD 102 of the example avionics system 100 may comprise a fault tolerant active-matrix LCD, but any suitable LCD technology may be used.

In the example avionics system 100 of FIG. 1, the screen area of the LCD 102 is conceptually divided into four regions. The first region is a ribbon display 106 that spans the entire width W of the LCD 102. The ribbon display 106 may contain relatively static information, such as audio communication radio "current" frequency and "next" radio frequency, navigation radio "current" frequency (e.g., VHF omnidirectional range (VOR) radio frequency) and navigation radio "next" frequency, and the like. In the example system of FIG. 1, the balance of the screen area of the LCD 102 is divided into three regions including a targeting camera area 110, flight parameters area 110, and map area 114, though the screen area of the LCD 102 can be divided into any number of regions. Regardless of the number of regions into which the screen area of the LCD 102 is divided, in various embodiments, the LCD 102 is nevertheless a single LCD having redundant driver circuits such that upon failure of a portion or all of the first driver circuit, the second driver circuit can take over and provide the avionics display full screen on the LCD 102.

Figure 2:
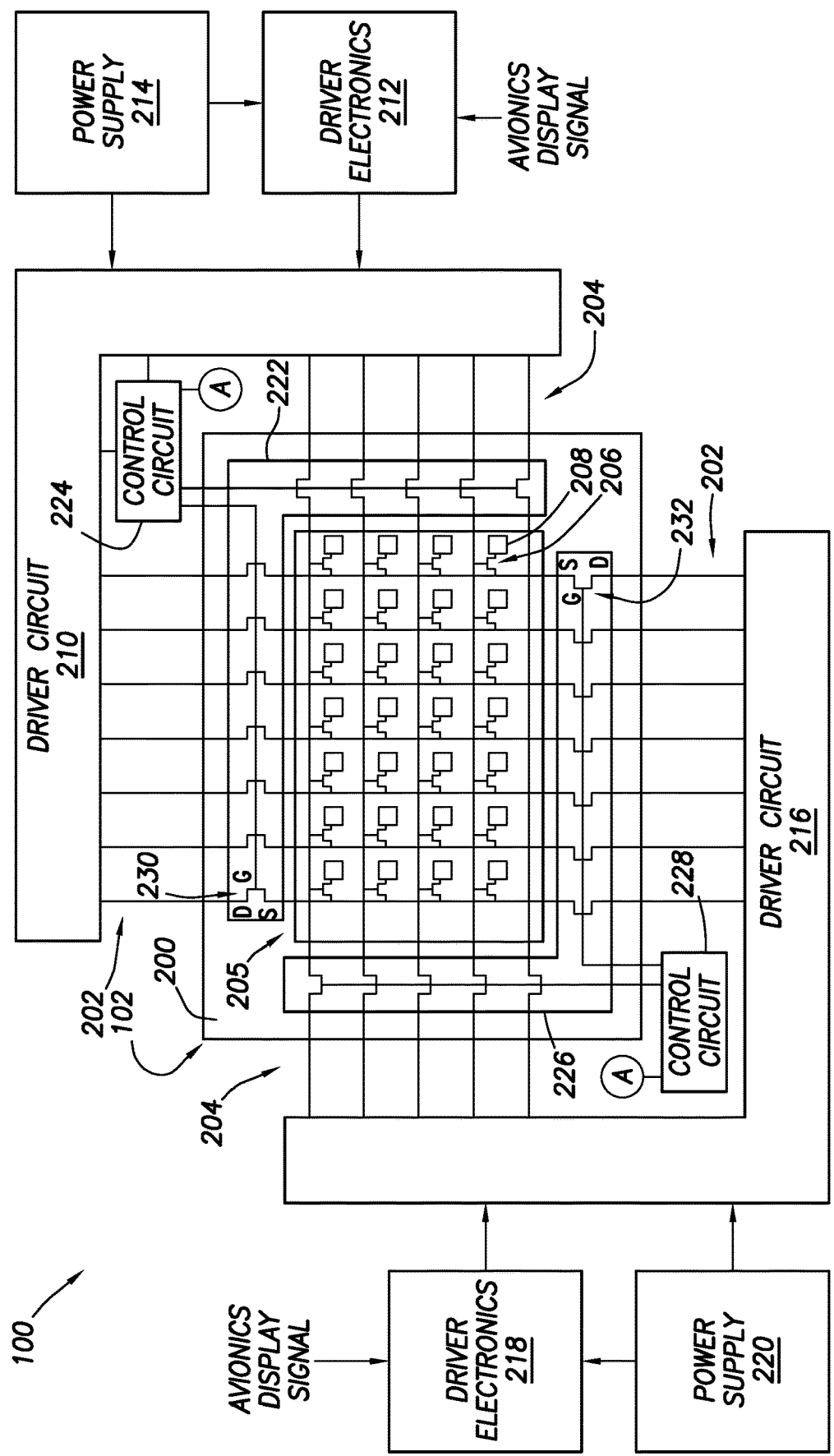
FIG. 2 shows an electrical block diagram of an avionics system in accordance with at least some embodiments.

FIG. 2 shows an electrical block diagram of an avionics system in accordance with at least some embodiments. In particular, the example system comprises the LCD 102 having panel glass 200, source signal lines 202, and gate signal lines 204. The source signal lines 202 in the example system run vertically through the LCD 102, and the gate signal lines 204 run horizontally, but the orientation may be reversed. LCD 102 may have many hundreds, thousands (or any desired number) of source signal lines and gate signal lines, but the example system shows only seven source signal lines 202 and five gate signal lines 204 so as not to unduly complicate the drawing. At each intersection of a source signal line and a gate signal line within the active area 205 of the panel glass 200 resides a transistor (e.g., transistor 206, lower right pixel) in the form of a field effect transistor (FET), with the gate of the transistor coupled to the gate signal line, and the source of the transistor coupled to the source signal line. The transistor at each intersection couples to a pixel electrode (e.g., pixel electrode 208, lower right pixel) of the overall LCD panel active area. The source signal lines 202, the gate signal lines 204, and the transistors 206 at each intersection within the LCD 102 may all be created using thin film deposition and etching techniques (or any other desired techniques). Thus, the transistors that form the pixels are thin-film transistors (TFT), and for that reason, the LCD 102 may be referred to as a TFT-LCD. The panel glass 200 may take any suitable form, such as a low-temperature amorphous silicon glass substrate, a low-temperature poly-silicon glass created by laser heating of an amorphous silicon glass substrate or any other desired glass substrate.

The example system further comprises a driver circuit 210. The driver circuit 210 electrically couples to each of the source signal lines 202 and each of the gate signal lines 204. The driver circuit 210 electrically couples to driver electronics 212 and a power supply 214. The power supply 214 receives input power in any suitable form (e.g., 12 Volts, 24 Volts in avionics systems or any other desired voltage), and converts the power to suitable voltages (e.g., 3.3 Volts or any other desired voltage) for the driver circuit 210 and the driver electronics 212. The driver electronics 212 receives an avionics display signal (e.g., from a master avionics unit, not specifically shown), converts the avionics display signal into appropriate source signals and gate signals, and provides the signals to the driver circuit 210. The driver circuit 210, in turn, drives the source signal lines 202 and gate signal lines 204 to facilitate showing the avionics display (e.g., including the various regions) on the screen area of the LCD 102 (such as shown in FIG. 1). Thus, the avionics system 100 may provide an avionics display full screen on the LCD using the driver circuit 210, driver electronics 212, and power supply 214.

Still referring to FIG. 2, the example avionics system 100 has full-screen LCD redundancy such that even in the presence of a failure of a portion of the electronics (e.g., failure of the driver circuit 210, driver electronics 212, and/or power supply 214), the avionics system 100 may nevertheless provide the avionics display full screen on the LCD 102. In order to achieve such fault-tolerance, the example avionics system 100 may further include another driver circuit 216. The driver circuit 216 electrically couples to each source signal line 202 and each gate signal line 204. The driver circuit 216 electrically couples to driver electronics 218 and a power supply 220. The power supply 220 receives input power in any suitable form (e.g., 12 Volts, 24 Volts in avionics systems or any other desired voltage), and converts the power to suitable voltages (e.g., 3.3 Volts or any other desired voltage) for the driver circuit 216 and the driver electronics 218. The driver electronics 218 receives the avionics display signal (e.g., from a master avionics unit, not specifically shown), converts the avionics display signal into appropriate source signals and gate signals, and provides the signals to the driver circuit 216. The driver circuit 216, in turn, drives the source signal lines 202 and gate signal lines 204 to facilitate showing the avionics display on the screen area of the LCD 102. Thus, the avionics system 100 may provide an avionics display full screen on the LCD panel using the driver circuit 216, driver electronics 218, and power supply 220. In accordance with example systems and methods, since each driver circuit (and related driver electronics and power supply) are designed and constructed to drive or provide the avionics display full screen, in some cases only one driver circuit (and related driver electronics and power supply) is electrically coupled to the pixel transistors (e.g., transistor 206) and pixel electrodes (e.g., pixel electrode 208) within the active area 205 at any one time. Before turning to a description of interaction between an active driver circuit and an inactive or inoperable driver circuit, some related-art approaches to fault tolerance are discussed below.

In accordance with at least some related-art systems, fault tolerance is implemented using redundant driver circuits (and related electronics); however, in some such related-art systems, each driver circuit is designed and constructed to drive only half the screen area of an LCD. For example, in some related-art systems, for an LCD having dimensions of 8×20 inches, the panel is conceptually divided into two 8×10 inch panel portions. One driver circuit provides an avionics display on one 8×10 inch panel portion, and the second driver circuit provides an avionics display on the other 8×10 inch panel portion. The fault tolerance in such related-art systems is that, in the event of an electronics or other failure of one driver circuit (and related electronics), only half the screen area of the LCD panel is lost. Assuming flexibility in assignment of avionics displays across the panel, certain information (e.g., attitude indicator, heading indicator, airspeed indicator) can be set to display on the remaining portion of the screen area of the LCD. While some functionality remains, the fault tolerance is less than ideal given that some information (e.g., engine status panel) may be unavailable to the pilot, or at least not easily available. Moreover, two untimely failures may render the entire avionics system unusable.

Other related-art systems have attempted to address these issues by having two driver circuits electrically coupled in parallel to the source signal lines and gate signal lines. During periods of time when both driver circuits are operational, both driver circuits provide voltage/current to each pixel transistor. When one driver circuit fails, the remaining driver circuit continues to drive the source signal lines and gate signal lines, possibly with increased driving energy. However, the inventor of the present invention has determined that driver circuits for source signal lines and gate signal lines, even if inactive, present a certain non-zero impedance. This non-zero impedance is a parasitic impedance that must be driven and/or accounted for by the active driver circuit. Driving the parasitic impedance of the inactive and/or inoperable driver circuit may not only damage the inactive driver circuit (thus rendering the inactive driver circuit incapable of taking over upon failure of the previous driver circuit), but may also cause the active driver circuit to fail prematurely because of the increased electrical loads of the parasitic impedance.

In accordance with at least some embodiments discussed herein, the issues noted with respect to the related-art systems are addressed, at least in part, by systems and related methods of preventing back biasing of the driver circuit that is either inactive or inoperable. Referring again to FIG. 2, the example avionics systems further comprise groups of isolation FETs associated with each driver circuit. For example, isolation FETs 222 are associated with driver circuit 210. The isolation FETs 222 are disposed directly on the panel glass 200 (e.g., using the same thin film construction techniques as the pixel transistors (e.g., transistors 206) and pixel electrodes (e.g., pixel electrodes 208)). The example isolation FETs 222 comprise one FET for each source signal line 202, and one FET for each gate signal line 204. For each source signal line 202, the respective FET electrically couples directly between the driver circuit 210 and the source signal line 202 on the panel glass 200. Likewise, for each gate signal line 204, the respective FET electrically couples directly between the driver circuit 210 and the gate signal line 204 on the panel glass 200. Referring to FET 230, as representative of all the isolation FETs 222, and assuming an N-channel MOSFET, the drain connection (D) couples directly to the driver circuit 210, the source connection (S) couples directly to the signal lines (here, the source signal lines 202) within the active area 205, and the gate connection (G) couples to the other gates and the control circuit 224 (discussed in more detail below). Other MOSFET types may be used. Thus, when the isolation FETs 222 are conductive, the driver circuit 210 is electrically coupled to the pixel transistors 206 of the LCD 102. When the isolation FETs 222 are non-conductive, the driver circuit 210 is electrically isolated from the pixel transistors 206 of the LCD 102. In example systems, a control circuit 224 electrically couples to the gates of all FETs of the isolation FETs 222, and makes the FETs conductive or non-conductive in conformance with the overall state of the avionics system 100.

Similarly, isolation FETs 226 are associated with driver circuit 216. The isolation FETs 226 are disposed directly on the panel glass 200 (e.g., using the same thin film construction techniques as the pixel transistors (e.g., transistor 206) and pixel electrodes (e.g., pixel electrode 208)). The example isolation FETs 226 comprise one FET for each source signal line 202, and one FET for each gate signal line 204. For each source signal line 202, the respective FET electrically couples directly between the driver circuit 216 and the source signal line 202 on the panel glass 200. Likewise, for each gate signal line 204, the respective FET electrically couples directly between the driver circuit 216 and the gate signal line 204 on the panel glass 200. Referring to FET 232, as representative of all the isolation FETs 226, and assuming an N-channel MOSFET, the drain connection (D) couples directly to the driver circuit 216, the source connection (S) couples directly to the signal lines (here, the source signal lines 202) within the active area 205, and the gate connection (G) couples to the other gates and the control circuit 228 (discussed in more detail below). Other MOSFET types may be used. Thus, when the isolation FETs 226 are conductive, the driver circuit 216 is electrically coupled to the pixel transistors 206 of the LCD panel 102. When the isolation FETs 226 are non-conductive, the driver circuit 216 is electrically isolated from the pixel transistors 106 of the LCD panel 102. In example systems, control circuit 228 electrically couples to the gates of all FETs of the isolation FETs 226, and makes the FETs conductive or non-conductive in conformance with the overall state of the avionics system 100. In some cases, the control circuit 228 is electrically coupled to control circuit 224 (e.g., bubble "A") such that the control circuits can coordinate.

Thus, in the example system of FIG. 2, when the driver circuit 210 (and related electronics) are providing the avionics display full screen on the LCD 102 by driving the source signal lines 202 and gate signal lines 204, the example system prevents back biasing of the driver circuit 216 by electrically isolating the driver circuit 216 by way of isolation FETs 226. If the system detects a failure of the driver circuit 210 (or related electronics), the full screen avionics display is provided by driving the source signal lines 202 and gate signal lines 204 by way of the driver circuit 216 through the isolation FETs 226, and the example system prevents back biasing of the driver circuit 210 by electrically isolating the driver circuit 210 by way of isolation FETs 222.

Thus, the example avionics system 100 can be operated in various modes to implement fault tolerance. For example, the control circuits 224/228 may implement a first mode in which the driver circuit 210 is electrically coupled to the source signal lines 202 and the gate signal lines 204 by way of the isolation FETs 222, and the second driver circuit 216 is electrically isolated from the source signal lines 202 and the gate signal lines 204 by way of the isolation FETs 226.

In this mode, the driver circuit 210 drives or provides the avionics display full screen on the LCD 102, and the back biasing of the driver circuit 216 is prevented by the electrical isolation provided by the isolation FETs 226. The control circuits 224/228 may also implement a second mode in which the driver circuit 210 is electrically isolated from the source signal lines 202 and the gate signal lines 204 by way of the isolation FETs 222, and the second driver circuit 216 is electrically coupled to the source signal lines 202 and the gate signal lines 204 by way of the isolation FETs 226. In this second mode, the driver circuit 216 drives or provides the avionics display full screen on the LCD 102, and the back biasing of the driver circuit 210 is prevented by the electrical isolation provided by the isolation FETs 222.

The various embodiments discussed to this point have considered the driver circuit 210 as a single set of elements, and likewise have considered the driver circuit 216 as a single set of elements. However, the various driver circuits and FETs used to selectively couple the driver circuits can be further conceptually divided, and the further conceptual divisions enable not only the fault tolerant operational modes discussed thus far, but also additional fault tolerant operational modes.

Figure 3:
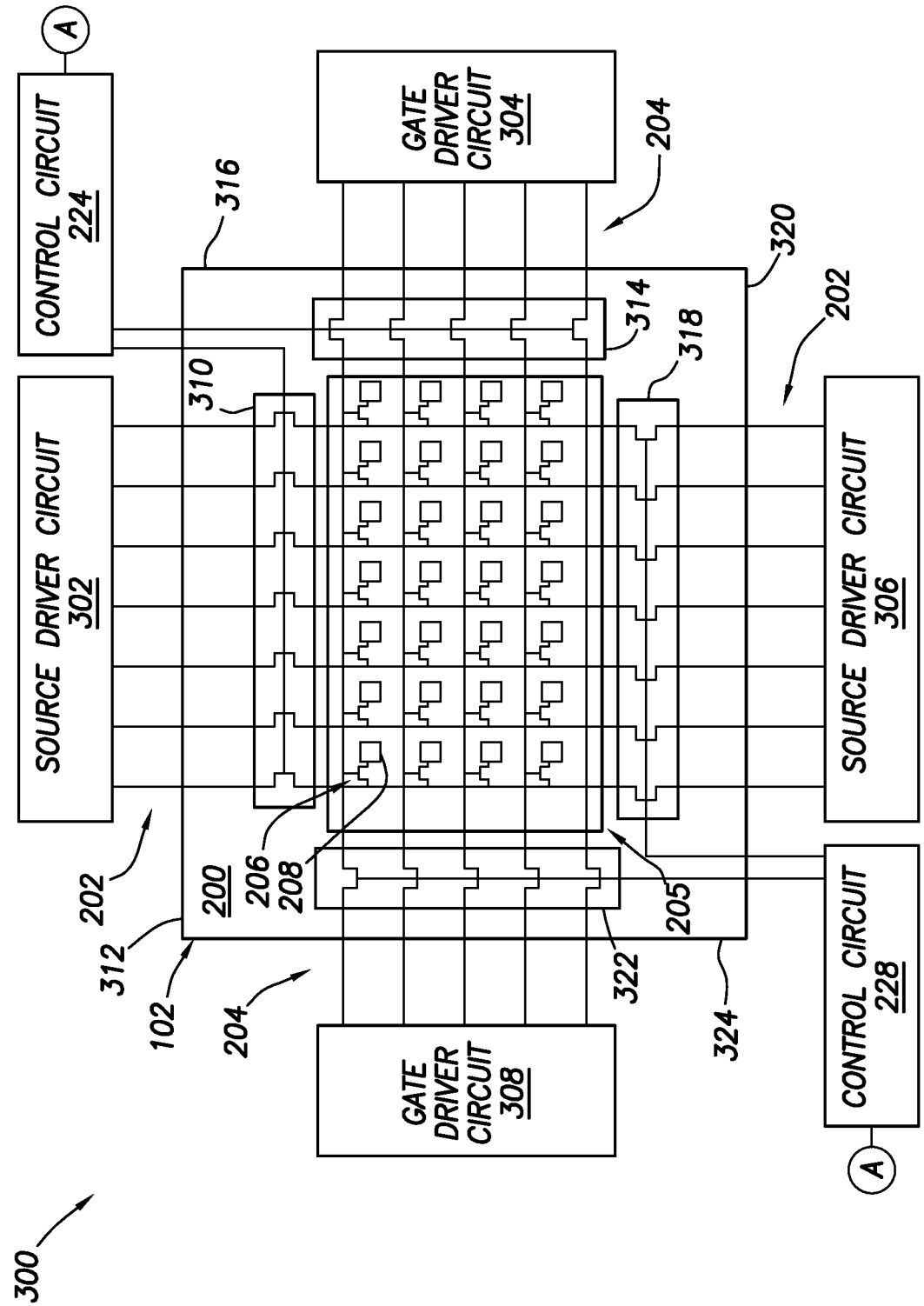
FIG. 3 shows an electrical block diagram of an avionics system in accordance with at least some embodiments.

FIG. 3 shows an electrical block diagram of an avionics system in accordance with at least some embodiments. In particular, FIG. 3 shows the avionics system 300 utilizing a fault-tolerant LCD system similar to avionics system 100, but where the source driver circuits and gate driver circuits may be selectively and individually coupled to the LCD 102. FIG. 3 is also used to provide more detail regarding placement of the isolation FETs. The example system comprises the LCD 102 having panel glass 200, source signal lines 202, and gate signal lines 204. As before, the source signal lines 202 in the example system run vertically through the LCD 102, and the gate signal lines 204 run horizontally. At each intersection of a source signal line 202 and a gate signal line 204 within the active area 205 of the panel glass 200 resides a transistor (e.g., transistor 206) in the form of a FET, with the gate of the transistor coupled to the gate signal line 204, and the source of the transistor coupled to the source signal line 202. The transistor 206 at each intersection couples to a pixel electrode (e.g., pixel electrode 208) of the overall LCD panel screen area.

Example avionics system 300 comprises the first driver circuit in the form of a first source driver circuit 302 and a first gate driver circuit 304. The source driver circuit 302 electrically couples to each of the source signal lines 202. The gate driver circuit 304 electrically couples to each of the gate signal lines 204. The source driver circuit 302 and gate driver circuit 304 also couple to dedicated driver electronics and a dedicated power supply, as discussed in FIG. 2, but those devices are not shown in FIG. 3 so as not to further complicate the figure. The source driver circuit 302, when active, drives the source signals to the source signal lines 202 to provide the full-screen avionics display on the LCD 102. Likewise, the gate driver circuit 304, when active, drives the gate signals to the gate signal lines 204 to provide the full-screen avionics display on the LCD 102. As discussed above, in some example modes the source driver circuit 302 works together with the gate driver circuit 304 to provide the full-screen avionics display.

In order to achieve fault tolerance, the example avionics system 300 further comprises the second driver circuit in the form of a second source driver circuit 306 and a second gate driver circuit 308. The source driver circuit 306 electrically couples to each of the source signal lines 202. The gate driver circuit 308 electrically couples to each of the gate signal lines 204. The source driver circuit 306 and gate driver circuit 308 also couple to dedicated driver electronics and a dedicated power supply, as discussed in FIG. 2, but those devices are not shown in FIG. 3 so as not to further complicate the figure. The source driver circuit 306, when active, drives the source signals to the source signal lines 202 to provide the full-screen avionics display on the LCD 102. Likewise, the gate driver circuit 308, when active, drives the gate signals to the gate signal lines 204 to provide the full-screen avionics display on the LCD 102. As discussed above, in some example modes the source driver circuit 306 works together with the gate driver circuit 308 to provide the full-screen avionics display.

As discussed with respect to avionics system 100, avionics system 300 likewise prevents back biasing of driver circuits that are either inactive or inoperable. Still referring to FIG. 3, the example avionics system 300 further comprises a first plurality or first set of FETs 310 associated with source driver circuit 302. The set of FETs 310 is disposed directly on the panel glass 200 along a first edge 312 of the panel glass 200. More particularly, the first set of FETs 310 is physically disposed between the active area 205 of the LCD 102 (i.e., that portion containing the pixel transistors 206 and the pixel electrodes 208) and the first edge 312. The example set of FETs 310 comprises one FET for each source signal line 202, each FET electrically coupled between the first source driver circuit 302 and the source signal lines 202 on the panel glass 200.

Likewise the example avionics system 300 further comprises a second plurality or second set of FETs 314 associated with gate driver circuit 304. The set of FETs 314 is disposed directly on the panel glass 200 along a second edge 316 of the panel glass 200, where the second edge 316 intersects the first edge 312 (and in some cases the second edge 316 is perpendicular to the first edge 312). More particularly, the second set of FETs 314 is physically disposed between the active area 205 of the LCD 102 and the second edge 314. The example set of FETs 314 comprises one FET for each gate signal line 204, each FET electrically coupled between the gate driver circuit 304 and the gate signal lines 204 on the panel glass 200. In the words used with respect to FIG. 2, together the first source driver circuit 302 and first gate driver circuit 304 form the first driver circuit (e.g., driver circuit 210 of FIG. 2).

When the first set of FETs 310 is conductive, the source driver circuit 302 is electrically coupled to the pixel transistors 206 of the LCD 102. When the first set of FETs 310 is non-conductive, the source driver circuit 302 is electrically isolated from the pixel transistors 206 of the LCD 102. Likewise, when the second set of FETs 314 is conductive, the gate driver circuit 304 is electrically coupled to the pixel transistors 206 of the LCD 102. When the second set of FETs 314 is non-conductive, the gate driver circuit 304 is electrically isolated from the pixel transistors 206 of the LCD 102. In the words used with respect to FIG. 2, together the first set of FETs 310 and second set of FETs 314 form isolation FETs (e.g., isolation FETs 222 of FIG. 2).

Still referring to FIG. 3, the example avionics system 300 further comprises a third plurality or third set of FETs 318 associated with source driver circuit 306. The third set of FETs 318 is disposed directly on the panel glass 200 along a third edge 320 of the panel glass 200. More particularly, the third set of FETs 318 is physically disposed between an active area 205 of the LCD 102 and the third edge 320, where in some cases the third edge 320 is parallel to the first edge 312. The example third set of FETs 318 comprise one FET for each source signal line 202, and each FET electrically coupled between the second source driver circuit 306 and the source signal lines 202 on the panel glass 200. As shown in FIG. 3, the third set of FETs 318 is disposed on an opposite side of the panel glass 200 (relative to the first set of FETs 310), and thus the third set of FETs 318 couples on the opposite ends of the source signal lines 202.

Likewise, the example avionics system 300 further comprises a fourth plurality or fourth set of FETs 322 associated with gate driver circuit 308. The fourth set of FETs 322 is disposed directly on the panel glass 200 along a fourth edge 324 of the panel glass 200, where the fourth edge 324 is opposite the second edge 316, and in some cases the fourth edge 324 is parallel to the second edge 316. More particularly, the fourth set of FETs 322 is physically disposed between the active area 205 of the LCD 102 and the fourth edge 324. The example fourth set of FETs 322 comprises one FET for each gate signal line 204, and each FET is electrically coupled between the second gate driver circuit 308 and the gate signal lines 204 on the panel glass 200. In the words used with respect to FIG. 2, together the second source driver circuit 306 and second gate driver circuit 308 form a second driver circuit (e.g., driver circuit 216 of FIG. 2).

When the third set of FETs 318 is conductive, the second source driver circuit 306 is electrically coupled to the pixel transistors 206 of the LCD 102. When the third set of FETs 318 is non-conductive, the second source driver circuit 306 is electrically isolated from the pixel transistors 206 of the LCD 102. Likewise, when the fourth set of FETs 322 is conductive, the second gate driver circuit 308 is electrically coupled to the pixel transistors 206 of the LCD 102. When the fourth set of FETs 322 is non-conductive, the gate driver circuit 308 is electrically isolated from the pixel transistors 206 of the LCD 102. In the words used with respect to FIG. 2, together the third set of FETs 318 and fourth set of FETs 322 form isolation FETs (e.g., isolation FETs 226 of FIG. 2).

In the example system of FIG. 3, control circuit 224 electrically couples to the gates of all FETs of the first set of FETs 310, and electrically couples to the gates of all the FETS of the second set of FETs 314. Control circuit 224 makes the FETs conductive or non-conductive in conformance with the overall state of the avionics system 300 and/or mode of operation. Likewise, control circuit 228 electrically couples to the gates of all FETs of the third set of FETs 318, and electrically couples to the gates of all the FETS of the fourth set of FETs 322. Control circuit 228 makes the FETs conductive or non-conductive in conformance with the overall state of the avionics system 300 and/or mode of operation. As with respect to avionics system 100, in some cases the control circuit 228 is electrically coupled to control circuit 224 (e.g., bubble "A") such that the control circuits can coordinate.

The example avionics system 300 of FIG. 3 can be operated similarly to the avionics system 100 of FIG. 2; that is, the first and second sets of FETs 310 and 314 can be operated as a group, and likewise the third and fourth sets of FETs 318 and 322 can be operated as a group. However, in some embodiments the additional fault-tolerance may be implemented by separately controlling the various sets of FETs. Consider, as an example, the avionic system 300 is driving or providing an avionics display full screen on the LCD by way of the first source driver circuit 302 and the first gate driver circuit 304 (and with the second source driver circuit 306 and second gate driver circuit 308 electrically isolated). Now consider that a fault occurs in the first gate driver circuit 304. The fault may be detected by the control circuits 224/228, or the fault may be detected by the pilot and the information communicated to the avionics system 300 in some form, such as by manual selection by the operator or any other desired approach. One approach to address the fault is to have the second source driver circuit 306 and second gate driver circuit 308 drive or provide the avionics display full screen on the LCD 102 (and with the first source driver circuit 302 and first gate driver circuit 304 electrically isolated). Thus, the example avionics systems 300 can still provide the avionics display full screen on the LCD 102. However, now consider that a second fault occurs, this time in second source driver circuit 306. Because the first fault in this example was in the first gate driver circuit 304, and in this example, the first source driver circuit 302 is still functional, the example system can still operate in spite of the second fault by driving the source signal lines 202 with the first source driver circuit 302 (and electrically isolating the second source driver circuit 306), and driving the gate signal lines 204 with the second gate driver circuit 308 (and electrically isolating first gate driver circuit 304).

Abstracted away from the example, the various embodiments may implement various operational modes in which the source signal lines 202 are driven by the source driver circuit from one portion of the redundant system, and the gate signal lines 204 are driven by a gate driver circuit from a functional portion of the redundant system. Thus, there are at least four possible operational modes in which the example system may operate: 1) providing the avionics display full screen on the LCD 102 by driving with the first source driver circuit 302 and first gate driver circuit 304 (and with the second source driver circuit 306 and second gate driver circuit 308 electrically isolated); 2) providing the avionics display full screen on the LCD 102 by driving with the second source driver circuit 306 and second gate driver circuit 308 (and with the first source driver circuit 302 and first gate driver circuit 304 electrically isolated); 3) providing the avionics display full screen on the LCD 102 by driving with the first source driver circuit 302 and second gate driver circuit 308 (and with the second source driver circuit 306 and first gate driver circuit 304 electrically isolated); and 4) providing the avionics display full screen on the LCD 102 by driving with the second source driver circuit 306 and first gate driver circuit 304 (and with the first source driver circuit 302 and second gate driver circuit 308 electrically isolated).

Figure 4:
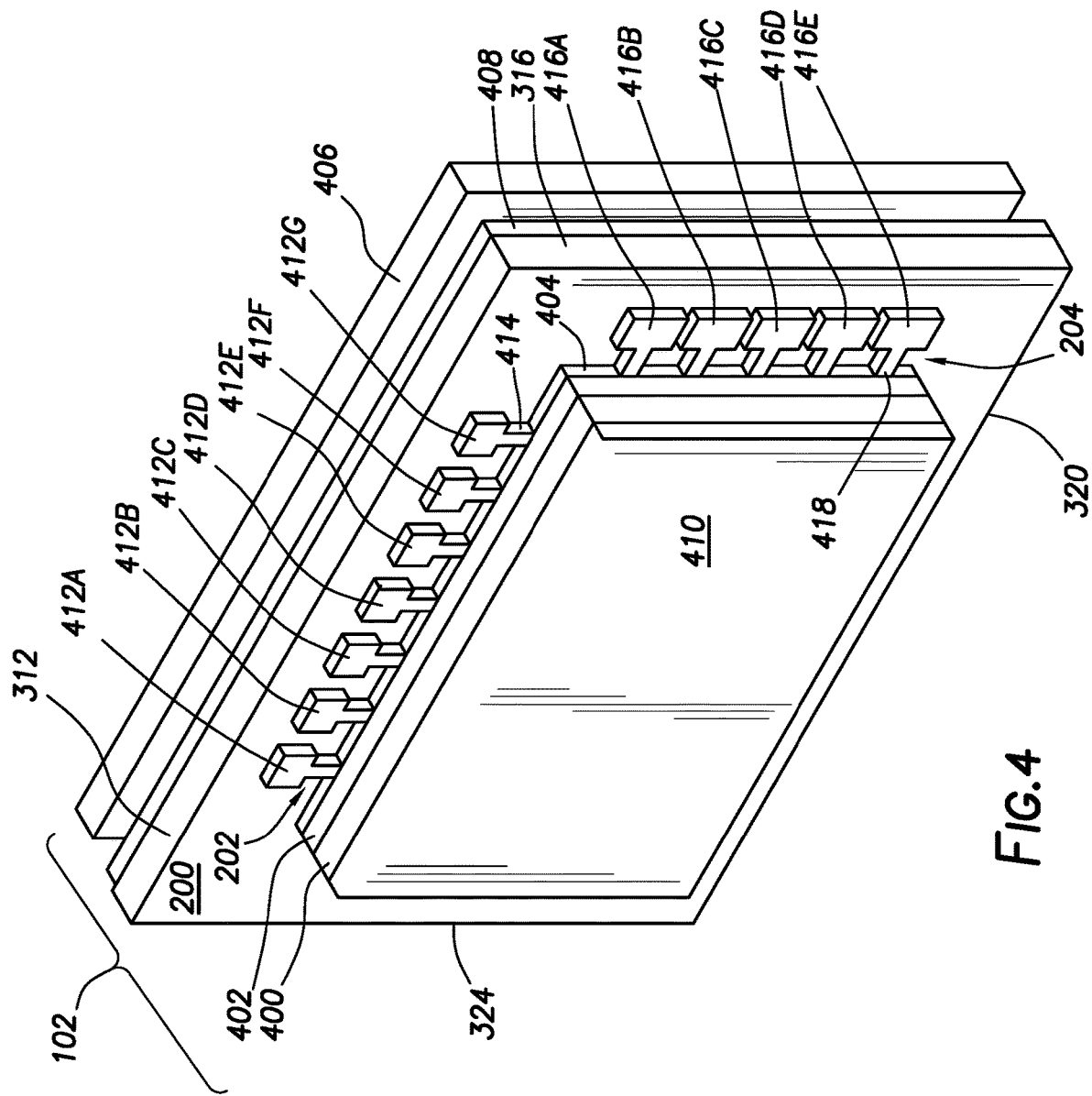
FIG. 4 shows a perspective view of an LCD in accordance with at least some embodiments.

FIG. 4 shows a perspective view of an LCD in accordance with at least some embodiments. In particular, FIG. 4 shows an example LCD 102 that comprises a front plate 400 and a rear plate or panel glass 200, where the front plate 400 and the panel glass 200 may be clear or visually transparent. Because the panel glass 200 also has disposed directly thereon the various pixel transistors 206 and pixel electrodes 208 (shown as thin film 404), the panel glass 200 is sometimes referred to as a "thin film transistor" (TFT) plate. A thin layer of liquid crystal material is disposed between the front plate 400 and the panel glass 200, but what is visible in FIG. 4 is an adhesive 402 that forms a perimeter that holds the liquid crystal material between the front plate 400 and the panel glass 200. On the backside of the LCD 102 is a back light 406. Any type of back light 406 may be used, including but not limited to direct lit, edge lit, and hybrid designs. The example system has two polarizers; one polarizer 408 between the back light 406 and the glass panel 200, and a second polarizer 410 on the outside surface of the front plate 400. The interaction of the light created with the polarizers 408 and 410, and the liquid crystal, creates the individual pixel colors and intensities.

The various pixel transistors 206 and pixel electrodes 208 are formed within and reside in the thin film 404. In accordance with example embodiments, the thin film disposed directly on the panel glass 200 also implements the various FETS used to selectively electrically couple and electrically isolate the various source signal drivers (not shown in FIG. 4). In particular, FIG. 4 shows seven FETs (412A-G) disposed along the first edge of the panel glass 200. Seven FETs 412 is merely an example, and in practice 1500 or more (or any other desired number) such FETs 412 (corresponding to the number of source signal lines) would be implemented. Each FET 412 electrically couples to a single source signal line 202. For example, example FET 412G couples to a source signal line 414. The internal structure of each individual FET 412 is not shown so as not to unduly complicate the figure. Moreover, the gate of each FET 412 would be coupled together as shown above, but in FIG. 4 the gate coupling is not shown again so as not to unduly complicate the figure. Coupling of the source signal driver to the FETs 412 may take any suitable form.

The thin film disposed directly on the panel glass 200 also implements the FETS used to selectively electrically couple and electrically isolate the various gate signal drivers (not shown in FIG. 4). In particular, FIG. 4 shows five FETs (416A-E) disposed along the second edge 316 of the panel glass 200. Five FETs 416 is merely an example, and in practice 500 or more (or any other desired number) such FETs 416 (corresponding to the number of gate signal lines) would be implemented. Each FET 416 electrically couples to a gate signal line 204. For example, example FET 416E couples to a gate signal line 418. The internal structure of each individual FET 416 is not shown so as not to unduly complicate the figure. Moreover, the gate of each FET 416 would be coupled together as shown above, but in FIG. 4 the gate coupling is not shown again so as not to unduly complicate the figure. Coupling of the source signal driver to the FETs 416 may take any suitable form. The example LCD 102 would likewise have FETS along the third edge 320 and the fourth edge 324, but those FETS are not visible in this view of FIG. 4.

Thus, the LCD 102 of FIG. 4 is combined with redundant sets of various driver circuits, electronics, and power supplies to implement the fault-tolerant system for use in avionics systems.

Figure 5:
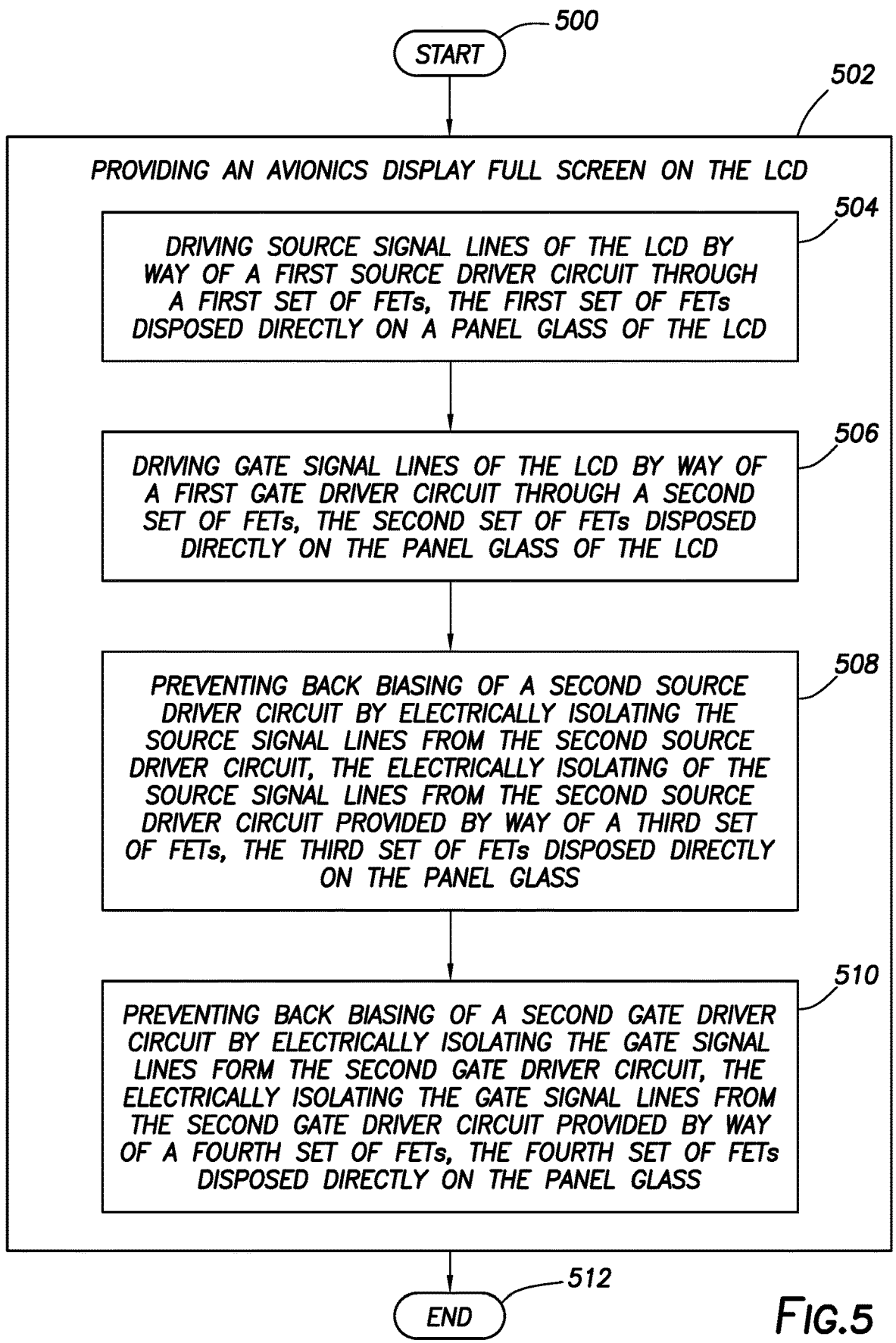
FIG. 5 shows a method in accordance with at least some embodiments.

FIG. 5 shows a method in accordance with at least some embodiments. In particular, the method starts (block 500) and comprises providing an avionics display full screen on the LCD (block 502). Providing the avionics display full screen may comprise: driving source signal lines of the LCD by way of a first source driver circuit through a first set of field effect transistors (FETs), the first set of FETs disposed directly on a panel glass of the LCD (block 504); driving gate signal lines of the LCD by way of a first gate driver circuit through a second set of FETs, the second set of FETs disposed directly on the panel glass of the LCD (block 506); preventing back biasing of a second source driver circuit by electrically isolating the source signal lines from the second source driver circuit, the electrically isolating of the source signal lines from the second source driver circuit provided by way of a third set of FETs, the third set of FETs disposed directly on the panel glass (Oblock 508); and preventing back biasing of a second gate driver circuit by electrically isolating the gate signal lines from the second gate driver circuit, the electrically isolating the gate signal lines from the second gate driver circuit provided by way of a fourth set of FETs, the fourth set of FETs disposed directly on the panel glass (block 510). Thereafter the method may end (block 512), likely to be immediately restarted.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating an avionics system with a fault-tolerant liquid crystal display (LCD), comprising:
 providing an avionics display full screen on the LCD by:
  driving source signal lines of the LCD by way of a first source driver circuit through a first set of field effect transistors (FETs), the first set of FETs disposed directly on a poly-silicon glass substrate of the LCD;
  driving gate signal lines of the LCD by way of a first gate driver circuit through a second set of FETs, the second set of FETs disposed directly on the poly-silicon glass substrate of the LCD;
  preventing back biasing of a second source driver circuit by electrically isolating the source signal lines from the second source driver circuit, the electrically isolating of the source signal lines from the second source driver circuit provided by way of a third set of FETs, the third set of FETs disposed directly on the poly-silicon glass substrate; and
  preventing back biasing of a second gate driver circuit by electrically isolating the gate signal lines from the second gate driver circuit, the electrically isolating the gate signal lines from the second gate driver circuit provided by way of a fourth set of FETs, the fourth set of FETs disposed directly on the poly-silicon glass substrate.

2. The method of claim 1 further comprising:
 detecting a failure of the first source driver circuit or the first gate driver circuit; and responsive to the detecting providing the avionics display full screen on the LCD by:
 driving the source signal lines of the LCD by way of the second source driver circuit through the third set of FETs;
 driving the gate signal lines of the LCD by way of the second gate driver circuit through the fourth set of FETs;
 preventing back biasing of the first source driver circuit by electrically isolating the source signal lines from the first source driver circuit, the electrically isolating of the source signal lines from the first source driver circuit being provided by way of the first set of FETs; and
 preventing back biasing of the first gate driver circuit by electrically isolating the gate signal lines from the first gate driver circuit, the electrically isolating of the gate signal lines from the first gate driver circuit being provided by way of the second set of FETs.

3. The method of claim 2 wherein detecting the failure of the first source driver circuit or the first gate driver circuit further comprises detecting by way of a monitoring circuit electrically coupled to the first source driver circuit and the first gate driver circuit.

4. The method of claim 2 wherein detecting the failure of the first source driver circuit or the first gate driver circuit further comprises receiving a command from a user of the fault-tolerant LCD to switch to the second source driver circuit and the second gate driver circuit.

5. The method of claim 1 further comprising:
detecting a failure of the first source driver circuit; and responsive to the detecting
providing the avionics display full screen on the LCD by:
driving the source signal lines of the LCD by way of the second source driver circuit through the third set of FETs;
driving the gate signal lines of the LCD by way of the first gate driver circuit or the second gate driver circuit; and
preventing back biasing of the first source driver circuit by electrically isolating the source signal lines from the first source driver circuit, the electrically isolating of the source signal lines from the first source driver circuit being provided by way of the first set of FETs.

6. The method of claim 1 further comprising:
detecting a failure of the first gate driver circuit; and responsive to the detecting
providing the avionics display full screen on the LCD by:
driving the gate signal lines of the LCD by way of the second gate driver circuit through the fourth set of FETs;
driving the source signal lines of the LCD by way of the first source driver circuit or the second source driver circuit; and
preventing back biasing of the first gate driver circuit by electrically isolating the gate signal lines from the first gate driver circuit, the electrically isolating of the gate signal lines from the first gate driver circuit being provided by way of the second set of FETs.

7. The method of claim 1:
wherein driving the source signal lines of the LCD comprises driving the source signal lines by way of the first source driver circuit through the first set of FETs disposed along a first edge of the poly-silicon glass substrate;
wherein driving the gate signal lines of the LCD comprises driving the gate signal lines by way of the first gate driver circuit through the second set of FETs disposed along a second edge of the poly-silicon glass substrate, the second edge intersecting the first edge;
wherein electrically isolating the source signal lines from the second source driver circuit comprises electrically isolating the source signal lines from the second source driver circuit by way of the third set of FETs disposed along a third edge of the poly-silicon glass substrate located opposite the first edge; and
wherein electrically isolating the gate signal lines from the second gate driver circuit comprises electrically isolating the gate signal lines from the second gate driver circuit by way of the fourth set of FETs disposed along a fourth edge of the poly-silicon glass substrate located opposite the second edge.

8. A fault-tolerant liquid crystal display (LCD) for avionic systems, comprising:
an LCD comprising a poly-silicon glass substrate, source signal lines, and gate signal lines;
a first driver circuit comprising a first source driver circuit coupled to the source signal lines, and a first gate driver circuit coupled to the gate signal lines;
a first plurality of field effect transistors (FETs) disposed directly on the poly-silicon glass substrate, the first plurality of FETs electrically coupled between the first source driver circuit and the source signal lines;
a second plurality of FETs disposed directly on the poly-silicon glass substrate, the second plurality of FETs electrically coupled between the first gate driver circuit and the gate signal lines;
a second driver circuit distinct from the first driver circuit, the second driver circuit comprising a second source driver circuit coupled to the source signal lines, and a second gate driver circuit coupled to the gate signal lines;
a third plurality of FETs disposed directly on the poly-silicon glass substrate, the third plurality of FETs electrically coupled between the second source driver circuit and the source signal lines;
a fourth plurality of FETs disposed directly on the poly-silicon glass substrate, the fourth plurality of FETs electrically coupled between the second gate driver circuit and the gate signal lines;
a control circuit electrically coupled to the first, second, third, and fourth plurality of FETs, the control circuit configured to implement a first mode in which the first driver circuit is electrically coupled to the source signal lines and the gate signal lines by way of the first and second plurality of FETs, and the second driver circuit is electrically isolated from the source signal lines and the gate signal lines by way of the third and fourth plurality of FETs; and
the control circuit being configured to implement a second mode in which the first driver circuit is electrically isolated from the source signal lines and the gate signal lines by way of the first and second plurality of FETs, and the second driver circuit is electrically coupled to the source signal lines and the gate signal lines by way of the third and fourth plurality of FETs.

9. The fault-tolerant LCD of claim 8 wherein the control circuit is further configured to implement a third mode in which the first source driver circuit is electrically coupled to the source signal lines by way of the first plurality of FETs, the second gate driver circuit is electrically coupled to the gate signal lines by way of the fourth plurality of FETs, the second source driver circuit is electrically isolated from the source signal lines by way of the third plurality of FETs, and the first gate driver circuit is electrically isolated from the gate signal lines by way of the second plurality of FETs.

10. The fault-tolerant LCD of claim 9 wherein the control circuit is further configured to implement a fourth mode in which the second source driver circuit is electrically coupled to the source signal lines by way of the third plurality of FETs, the first gate driver circuit is electrically coupled to the gate signal lines by way of the second plurality of FETs, the first source driver circuit is electrically isolated from the source signal lines by way of the first plurality of FETs, and the second gate driver circuit is electrically isolated from the gate signal lines by way of the fourth plurality of FETs.

11. The fault-tolerant LCD of claim 8 further comprising:
the first plurality of FETs disposed along a first edge of the poly-silicon glass substrate;
the second plurality of FETs disposed along a second edge of the poly-silicon glass substrate, the second edge intersecting the first edge;
the third plurality of FETs disposed along a third edge of the poly-silicon glass substrate located opposite the first edge; and
the fourth plurality of FETs disposed along a fourth edge of the poly-silicon glass substrate located opposite the second edge.

12. A method of operating a fault-tolerant liquid crystal display (LCD) comprising:
driving source signal lines of the LCD by way of a first source driver circuit through a first set of field effect transistors (FETs), the first set of FETs disposed directly on a poly-silicon glass substrate of the LCD;

driving gate signal lines of the LCD by way of a first gate driver circuit through a second set of FETs, the second set of FETs disposed directly on the poly-silicon glass substrate of the LCD;

electrically isolating the source signal lines from a second source driver circuit by way of a third set of FETs, the third set of FETs disposed directly on the poly-silicon glass substrate; and electrically isolating the gate signal lines from a second gate driver circuit by way of a fourth set of FETs, the fourth set of FETs disposed directly on the poly-silicon glass substrate.

13. The method of claim 12 further comprising:

detecting a failure of the first source driver circuit or the first gate driver circuit; and responsive to the detecting;

electrically isolating the source signal lines from the first source driver circuit by way of the first set of FETs;

electrically isolating the gate signal lines from the first gate driver circuit by way of the second set of FETs;

driving the source signal lines of the LCD by way of the second source driver circuit through the third set of FETs; and driving the gate signal lines of the LCD by way of the second gate driver circuit through the fourth set of FETs.

14. The method of claim 13 wherein detecting the failure of the first source driver circuit or the first gate driver circuit comprises detecting by way of a monitoring circuit electrically coupled to the first source driver circuit and the first gate driver circuit.

15. The method of claim 13 wherein detecting the failure of the first source driver circuit or the first gate driver circuit comprises receiving from a user of the fault-tolerant LCD system to switch to the second source driver circuit and the second gate driver circuit.

16. The method of claim 12 wherein driving the source signal lines of the LCD comprises driving the source signal lines by way of the first source driver circuit through the first set of FETs disposed along a first edge of the poly-silicon glass substrate.

17. The method of claim 16 wherein driving the gate signal lines of the LCD comprises driving the gate signal lines by way of the first gate driver circuit through the second set of FETs disposed along a second edge of the poly-silicon glass substrate, the second edge being perpendicular to the first edge.

18. The method of claim 17 wherein electrically isolating the source signal lines from the second source driver circuit comprises electrically isolating the source signal lines from the second source driver circuit by way of the third set of FETs disposed along a third edge of the poly-silicon glass substrate located opposite the first edge.

19. The method of claim 18 wherein electrically isolating the gate signal lines from the second gate driver circuit further comprises electrically isolating the gate signal lines from the second gate driver circuit by way of the fourth set of FETs disposed along a fourth edge of the poly-silicon glass substrate located opposite the second edge.

* * * * *